(12) United States Patent
Wisner et al.

(10) Patent No.: US 7,919,562 B2
(45) Date of Patent: Apr. 5, 2011

(54) PREPARATION OF SUPRAMOLECULAR POLYMERS CONTAINING SEQUENCE-SELECTIVE HYDROGEN BONDING SUBUNITS IN THEIR BACKBONE WHICH FORM DOUBLE HELICES

(75) Inventors: James Andrew Wisner, St. Thomas (CA); Jiaxin Li, London (CA)

(73) Assignee: The University of Western Ontario, London, Ontario (CA)

( * ) Notice: Subject to any disclaimer, the term of this patent is extended or adjusted under 35 U.S.C. 154(b) by 148 days.

(21) Appl. No.: 12/227,860

(22) PCT Filed: May 31, 2007

(86) PCT No.: PCT/CA2007/000969
§ 371 (c)(1),
(2), (4) Date: May 5, 2009

(87) PCT Pub. No.: WO2007/137430
PCT Pub. Date: Dec. 6, 2007

(65) Prior Publication Data
US 2009/0318626 A1    Dec. 24, 2009

Related U.S. Application Data

(60) Provisional application No. 60/809,342, filed on May 31, 2006.

(51) Int. Cl.
*C08F 26/06* (2006.01)
(52) U.S. Cl. .............. 525/327.1; 424/78.36; 424/78.38; 514/772.7; 514/788; 514/950; 525/417; 525/535; 525/540; 528/373; 528/377; 528/391; 528/422; 528/423
(58) Field of Classification Search .............. 424/78.36, 424/78.38; 514/772.7, 788, 950; 525/327.1, 525/417, 535, 540; 528/373, 377, 391, 422, 528/423
See application file for complete search history.

(56) References Cited

U.S. PATENT DOCUMENTS

| 6,320,018 | B1 * | 11/2001 | Sijbesma et al. ............. 528/310 |
| 6,632,919 | B1 | 10/2003 | Nielsen |
| 6,803,447 | B2 | 10/2004 | Janssen |
| 6,814,964 | B2 | 11/2004 | Virtanen |
| 7,022,808 | B2 * | 4/2006 | Hall et al. ............. 528/327 |

OTHER PUBLICATIONS

Chou, P.T., et al.; J. Am. Chem. Soc., 2002 (124), p. 4287-4297.*
Hunter, C.A., et al.; J. Am. Chem. Soc., 2000 (122), p. 8856-8868.*
Zimmerman, S.C.; Corbin, P.S.; J. Am. Chem. Soc., 2000 (122), p. 3779-3780.*
Gong, B., et al.; J. Am. Chem. Soc., 1999 (121), p. 5607-5608.*
Cuccia. L.A., Chem., Eur. J. (2002), 8(15), pp. 3448-3457.

* cited by examiner

*Primary Examiner* — David Wu
*Assistant Examiner* — Robert Jones
(74) *Attorney, Agent, or Firm* — Lynn C. Schumacher; Hill & Schumacher

(57) ABSTRACT

The present invention relates to supramolecular polymers containing sequence-selective hydrogen bonding subunits in their backbone which form double helices. The invention allows for tuning of the numbers and sequences of donor/acceptor units incorporated in any one crosslinking hydrogen bonding subunit and hence tuning of the interaction strength not only through the amount of crosslinking material incorporated but also through modulation of the strength of the crosslinking interactions. It also allows for the incorporation of more than one type of crosslinking agent in the material allowing for multiple strengths of crosslinking which are each tunable with regard to disruption from solvent, temperature and stress. Hydrogen bond strength between oligomeric chains can be tailored through modification of the numbers and sequences of the donors/acceptors in the oligomers. The oligomers are sequence-specific and will generally only hydrogen-bond to oligomeric chains which are composed of a complementary set of donors/acceptors. The hydrogen bonded motif formed by the interacting oligomers is helical, imparting both chirality and intertwined topology to these interaction points. Because the polymer end units react with their complements through hydrogen bonding, the telechelic polymer(s) incorporating this technology are reversibly able to be processed as the bonds are first broken and then reformed. This has applications in a number of fields such as inkjet inks, adhesives, printing plates and microphase patterning of polymer surfaces.

21 Claims, 15 Drawing Sheets

Sulfone is an achiral alternative with similar properties

Synthesis of self-complementary AD and ADA oligomers

Synthesis of a self-complementary ADADA pentamer

1H NMR of ADADA Pentamer with dimerization constant
And related free energy of complexation Synthesis of a self-complementary ADADADA heptamer

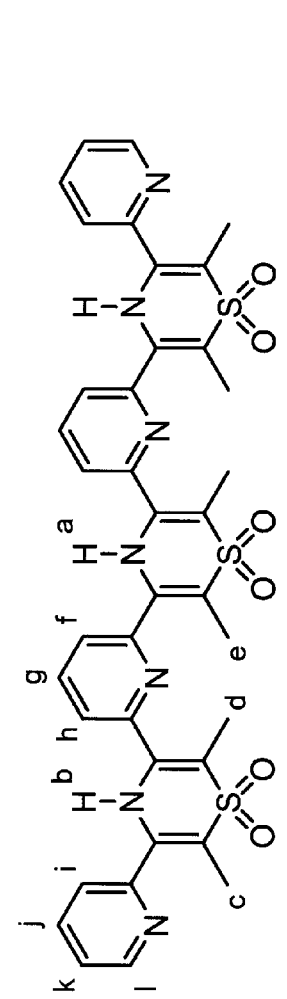
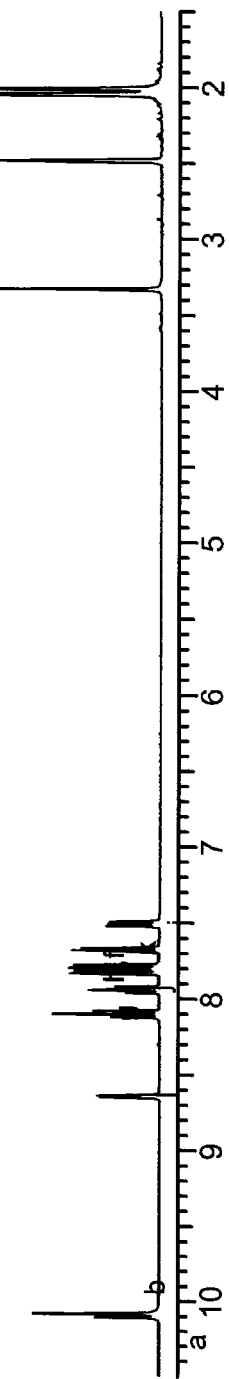
Figure 15

PREPARATION OF SUPRAMOLECULAR POLYMERS CONTAINING SEQUENCE-SELECTIVE HYDROGEN BONDING SUBUNITS IN THEIR BACKBONE WHICH FORM DOUBLE HELICES

CROSS REFERENCE TO RELATED U.S. APPLICATIONS

This patent application is a National Phase application claiming the benefit of PCT/CA2007/000969 filed on May 31, 2007; which further claims the priority benefit from U.S. Provisional Patent Application Ser. No. 60/809,342 filed on May 31, 2006, in English, entitled PREPARATION OF SUPRAMOLECULAR POLYMERS CONTAINING SEQUENCE-SELECTIVE HYDROGEN BONDING SUBUNITS IN THEIR BACKBONE WHICH FORM DOUBLE HELICES, and which is incorporated herein by reference in its entirety.

FIELD OF THE INVENTION

The present invention relates to supramolecular polymers containing sequence-selective hydrogen bonding subunits in their backbone which form double helices and methods of preparation thereof.

BACKGROUND OF THE INVENTION

Referring to FIG. 1, the present invention relates to the incorporation of information at the molecular level. The inspiration for sequential information storage is DNA, which uses hydrogen bonding to encode the information. A hydrogen bond donor or acceptor is a heteroatom (usually N or O) which may use either its lone pair of electrons (acceptor, negatively polarized) or attached hydrogen atom (donor, positively polarized) to reversibly interact via electrostatics with an opposing donor or acceptor in a non-covalent manner. The nucleobases are actually a "code" within a code, and display coplanar arrays of 2-3 hydrogen bond donor/acceptors (A's or D's in slide) depending on their identity as A, T, C, or G. Thus, only those nucleobases which have complementary sets of A/D's will recognize each other and this forms part of the basis for double helix formation in a sequence-specific manner. Each strand of DNA contains a particular sequence of nucleobases connected by a sugar-phosphodiester backbone which pairs up with a strand containing the complementary sequence.

FIGS. 2 and 3 (the same but some nitrogen (N) and oxygen (O) atoms have been highlighted in FIG. 3) give examples of coplanar arrays which are designed based on the example of DNA. This typical coplanar and linear 1,3-disposition of D/A's is used in almost all present systems, the exceptions being Gong et al. as disclosed in J. Am. Chem. Soc. 2000, 122, 2635-2644, "A Highly Stable Six Hydrogen-Bonded Molecular Duplex"; which is based on more widely spaced amide groups. Strength of the association between interacting species is based on the number of primary and secondary hydrogen bonding interactions and is hence code dependent. Strong binding-generally requires at least two contiguous D's or A's and generally at least four (4) primary interactions. These systems often suffer from: conformational and tautomeric ambiguity; they are often relatively insoluble, requiring the addition of solubilizing groups on their periphery; the synthesis of higher than four (4) D/A pairs is often problematic and certain sequences have not ever been reported (e.g. DDDD/AAAA). In addition, the syntheses of these types of compounds are generally specific to the particular compound and each one generally requires a custom synthetic scheme.

Notwithstanding the above difficulties, these units have been used in the preparation of supramolecular polymers through their attachment as either telechelic end units onto short linkers or oligomeric/polymeric linkers and as side chains through addition as functionalized comonomers in copolymerization schemes. Such schemes which have been described in the prior patent literature are discussed below.

U.S. Pat. No. 6,320,018 describes the synthesis of a supramolecular subunit based on a ureidopyrimidine heterocycle which is self-complementary through a linear and coplanar AADD arrangement of hydrogen bond donors/acceptors (D's/A's) or its tautomeric form (ADAD). These subunits are appended as end groups onto short (though one siloxane example is oligomeric with MW=6000 g mol$^{-1}$) monomer backbones. The self-association of the end groups in the solid state through strong, selective and reversible hydrogen bonding mimics the strength of a weak covalent bond and "polymerizes" the monomers through this association such that they take on the properties of a much higher molecular weight material similar to that of a true polymer material. The approach is based on a single heterocyclic subunit which does not provide the option of altering either the kinetics or thermodynamics of the non-covalent hydrogen-bonding interactions between associating end groups.

U.S. Pat. No. 6,803,447 describes the synthesis of copolymers which incorporate both well known monomers and monomers that have been functionalized with self-associating subunits described above. The incorporation of the self-associating subunits provides reversible crosslinking in the material to generate a material which behaves as if it were crosslinked under ambient temperature. The virtual crosslinking behaviour can be reduced at elevated temperature and thus increases the ease of processing of the material in comparison to a regularly crosslinked polymer.

U.S. Pat. No. 7,025,813 describes the synthesis and formulation of inks which incorporate either self-associating end groups (one or two) or end groups which are complementary to other additives which must be present for the association event to occur. This provides the inks with either solvent or phase change behaviour such that evaporation of the solvent leads to solidification of the dye or a change in temperature changes the dye's phase from liquid to solid (or vice versa).

Present technologies use only a single type of hydrogen bond donor/acceptor unit as a crosslinking unit in these polymer composites. Tuning of the material properties in this case is achieved through variation of the amount of crosslinking agent incorporated in the material.

Therefore it would be very advantageous to provide a method of preparation of supramolecular polymers containing sequence-selective hydrogen bonding subunits in their-backbone which overcomes the aforementioned problems.

SUMMARY OF THE INVENTION

Accordingly, the present invention provides a method of preparation of supramolecular polymers containing sequence-selective hydrogen bonding subunits in their backbone which form double helices.

The present invention provides a supramolecular oligomer comprising at least two oligomeric chains each having a backbone with pre-selected numbers and sequences of donor/acceptor hydrogen bonding heterocyclic units covalently attached in a meta disposition, wherein in each oligomeric chain, heteroatoms in neighboring hydrogen bonding heterocyclic units participating in hydrogen bonding are in a 1,4 disposition with respect to each other, wherein the at least two oligomeric chains hydrogen bond together in a sequence specific manner to form a double helix, whose overall strength of intermolecular interaction is tunable by the pre-selected number and sequence of the hydrogen bonding heterocyclic units in each oligomeric chain.

In a non-limiting but illustrative example, the invention present invention provides a method by which oligomers comprised of pyridine (hydrogen bond acceptor) and thiazine-1,1-dioxide (hydrogen bond donor) are connected to each other in any arrangement and number of donors and acceptors through the 2,6-(pyridine) and the 3,5-(thiazine dioxide) positions.

These oligomers may be attached to existing polymers/oligomers (e.g. polysiloxane, polyethylene glycol, polystyrene, polyethylene, polyphenols, polyacrylates, polyesters, etc.) through attachment/incorporation of the polymer/oligomer backbones and/or telechelic sites at any one or all of the 3, 4, and 5 positions of the pyridine subunits and/or the 2 and/or 6 positions of the thiazine dioxide subunits using covalent linkages. Incorporation of small amounts of chiral material as covalent modifications of the basic donor/acceptor backbone at the aforementioned positions also induces a particular handedness to the resulting helical structures formed allowing for the creation of chiral materials with little chiral material required. Additionally, these supramolecular polymer systems may be used to induce microphase separation In blends with normal polymers to create micropatterned materials.

The hydrogen bond donor/acceptor oligomers may be attached to common oligomers/polymers as telechelic end units, comonomers in a copolymerization with traditional monomers, or as separate additives. This produces polymeric hydrogen bonded materials with temperature, solvent and stress-dependent properties which can be tailored through modification of the numbers and sequences of the donors/acceptors present in the oligomers. A telechelic polymer is one containing one or more functional end groups that have the capacity for selective reaction to form bonds with another molecule.

The invention described herein allows for tuning of the numbers and sequences of donor/acceptor units incorporated in any one crosslinking hydrogen bonding subunit and hence tuning of the interaction strength not only through the amount of crosslinking material incorporated but also through modulation of the strength of the crosslinking interactions. It also allows for the incorporation of more than one type of crosslinking agent in the material allowing for multiple strengths of crosslinking which are each tunable with regard to disruption from solvent, temperature and stress.

Hydrogen bond strength between oligomeric chains can be tailored through modification of the numbers and sequences of the donors/acceptors in the oligomers. The oligomers are sequence-specific and will generally only hydrogen-bond to oligomeric chains which include a complementary set of donors/acceptors. The hydrogen bonded motif formed by the interacting oligomers is helical, imparting both chirality and intertwined topology to these interaction points. Because the polymer end units react with their complements through hydrogen bonding, the telechelic polymer(s) incorporating this technology are reversibly able to be processed as the bonds are first broken and then reformed. This has applications in a number of fields such as inkjet inks, adhesives, printing plates and microphase patterning of polymer surfaces.

A further understanding of the functional and advantageous aspects of the invention can be realized by reference to the following detailed description and drawings.

BRIEF DESCRIPTION OF THE DRAWINGS

Embodiments of the present invention are described in greater detail with reference to the accompanying drawings.

FIG. 15 shows the 1H NMR of the ADADADA Heptamer of FIG. 14.

DETAILED DESCRIPTION OF THE INVENTION

Figure 1:
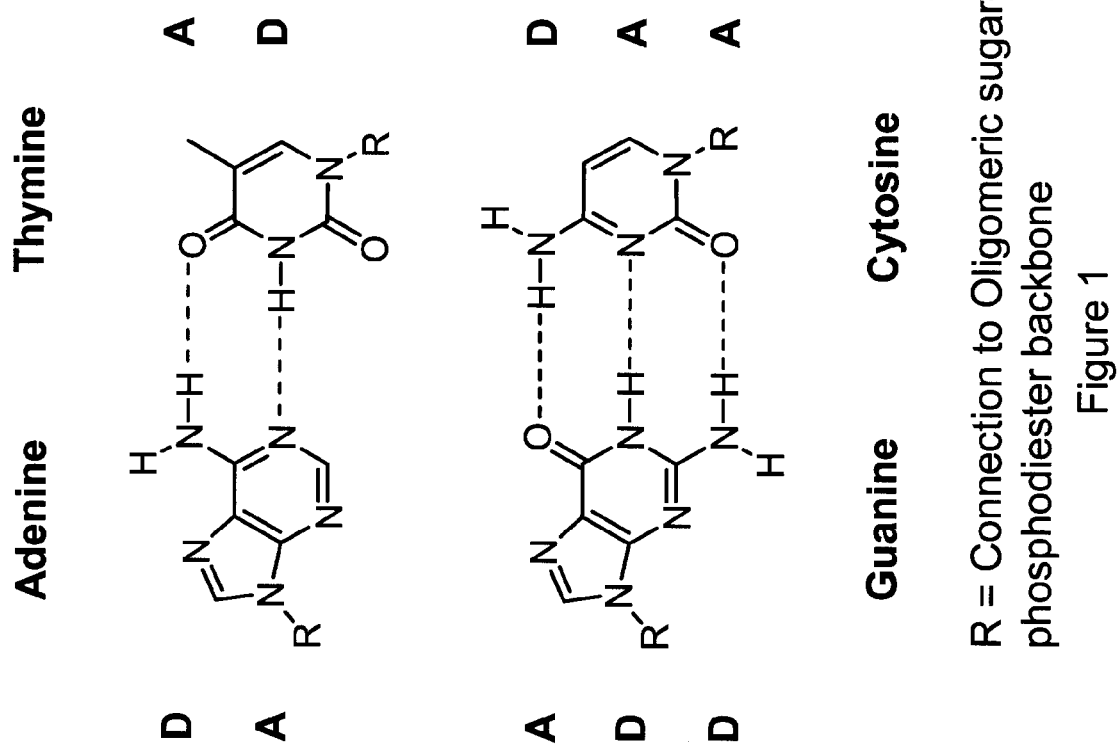
FIG. 1 shows how DNA uses hydrogen bonding to encode sequence information.

Generally speaking, the systems described herein are directed to supramolecular polymers containing sequence-selective hydrogen bonding subunits in their backbone which form double helices and methods of preparation thereof. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to supramolecular polymers containing sequence-selective hydrogen bonding subunits in their backbone which form double helices and methods of preparation thereof.

As used herein, the term "about", when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

Thus the present invention discloses embodiments of methods of preparation of supramolecular polymers containing sequence-selective hydrogen bonding subunits in their backbone which form double helices.

The hydrogen bond donor/acceptor oligomers may be attached to common oligomers/polymers as telechelic end units, as comonomers in a copolymerization with traditional monomers, or as separate additives. This gives polymeric hydrogen bonded materials with temperature, solvent and stress-dependent properties which can be tailored through modification of the numbers and sequences of the donors/acceptors present in the oligomers. A telechelic polymer is one containing one or more functional end groups that have the capacity for selective reaction to form bonds with another molecule.

Hydrogen bond strength between oligomeric chains can be tailored through modification of the numbers and sequences of the donors/acceptors in the oligomers. The oligomers are sequence-specific and will generally only hydrogen-bond to oligomeric chains which are composed of a complementary set of donors/acceptors. The hydrogen bonded motif formed by the interacting oligomers is helical, imparting both chirality and intertwined topology to these interaction points. Because the polymer end units react with their complements through hydrogen bonding, the telechelic polymer(s) incorporating this technology are reversibly able to be thinned and thickened as the bonds are first broken and then reformed. This has applications in a number of fields.

Figure 2:
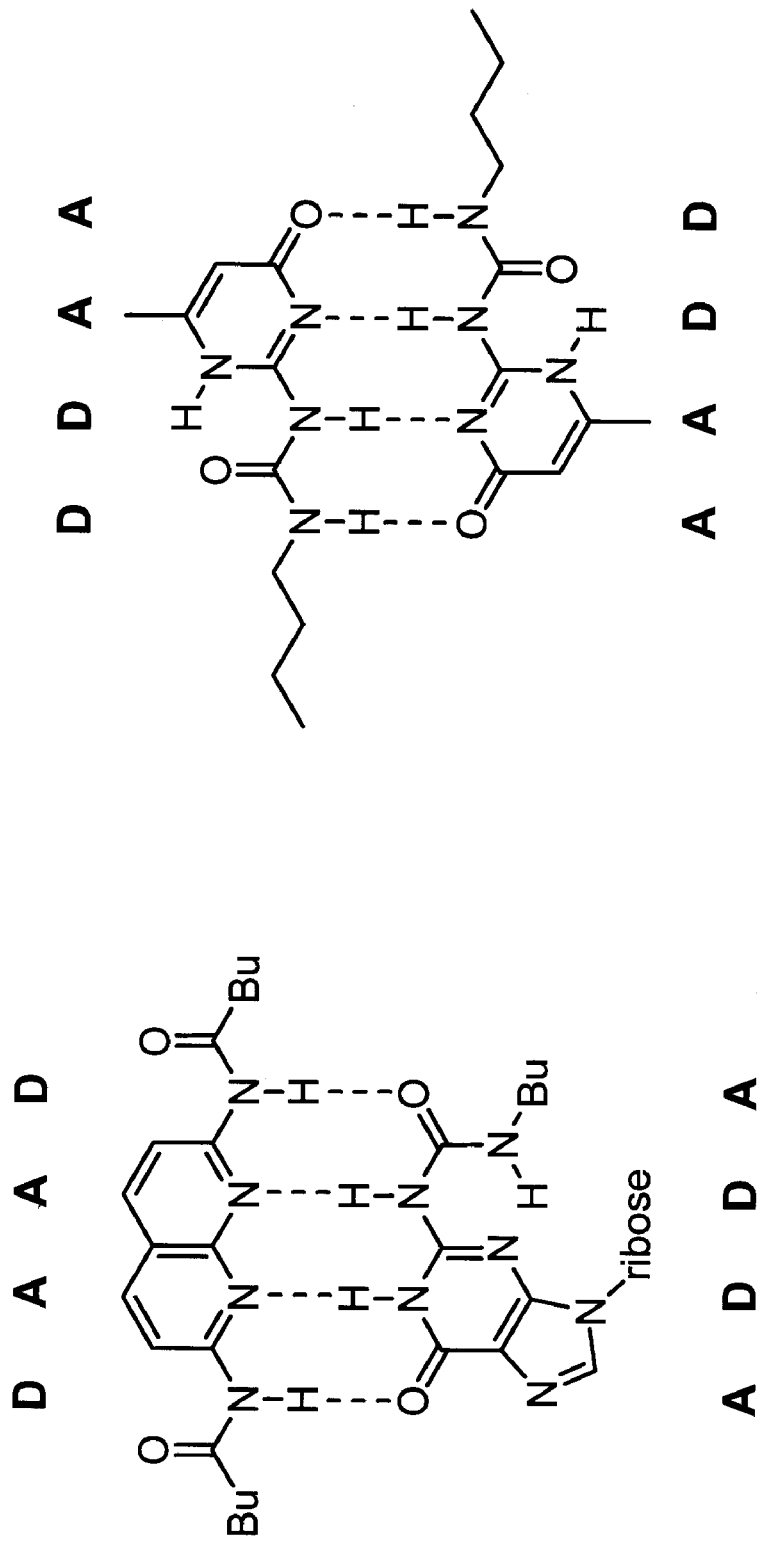
FIGS. 2 and 3 show almost all existing systems use this 1,3-type arrangement.
Figure 3:
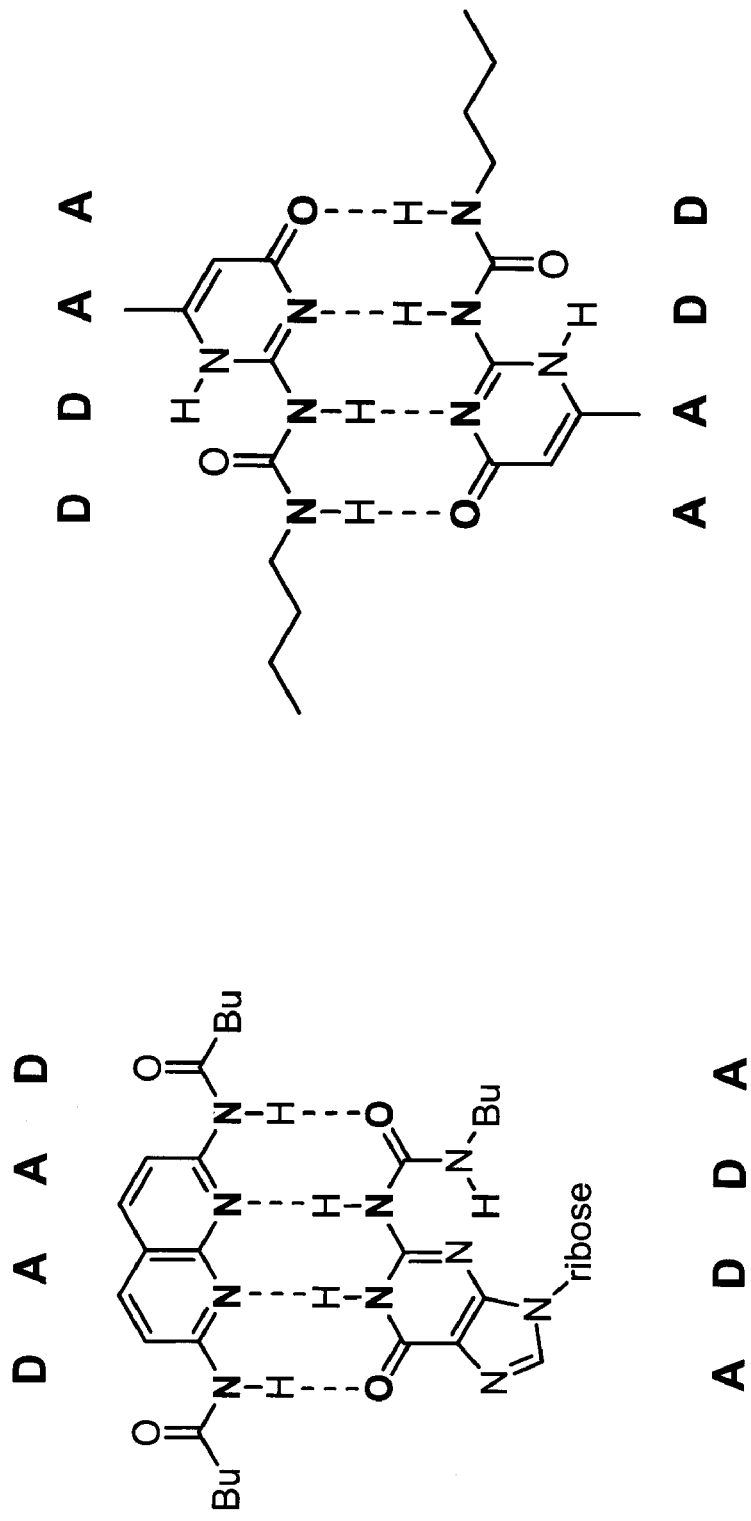
Figure 4:
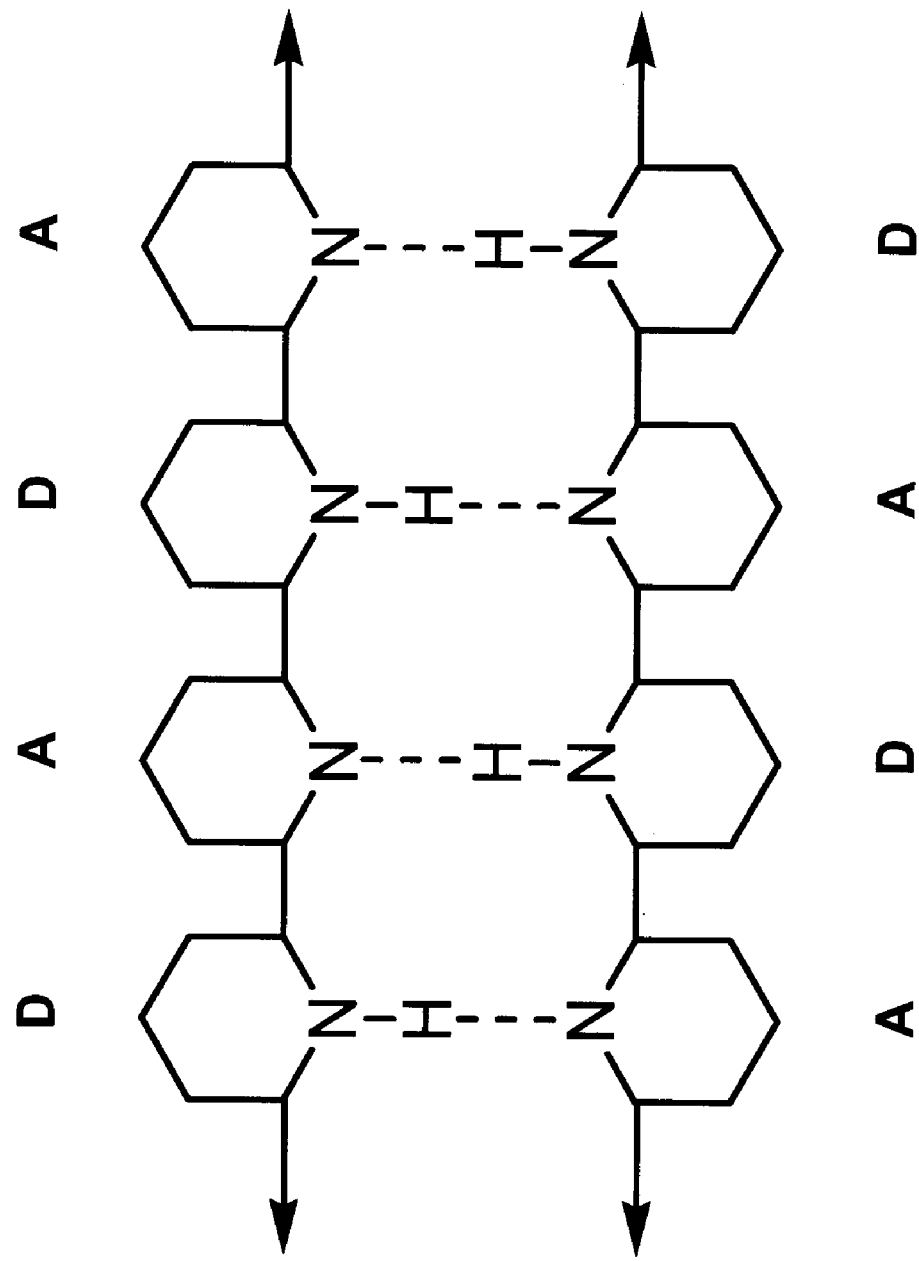
FIGS. 4 to 8 show embodiments of a change to a 1,4-type arrangement compared to the 1,3-type arrangement of FIG. 2.
Figure 5:
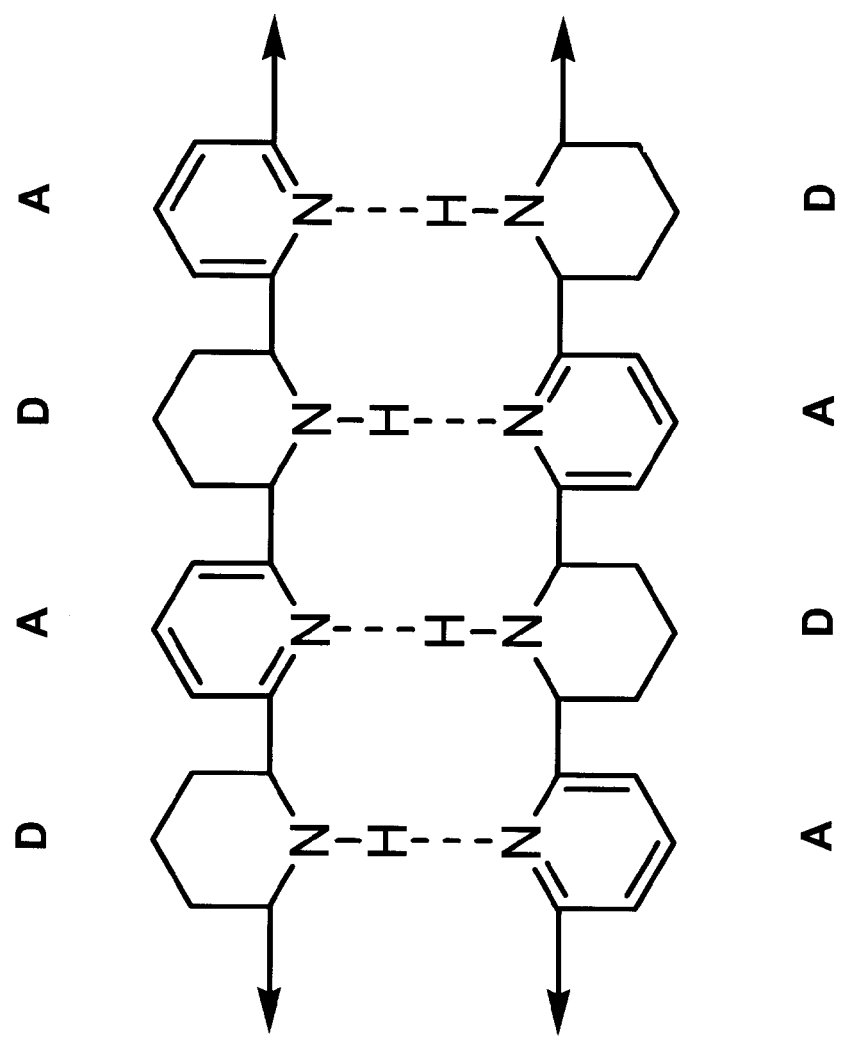
Figure 6:
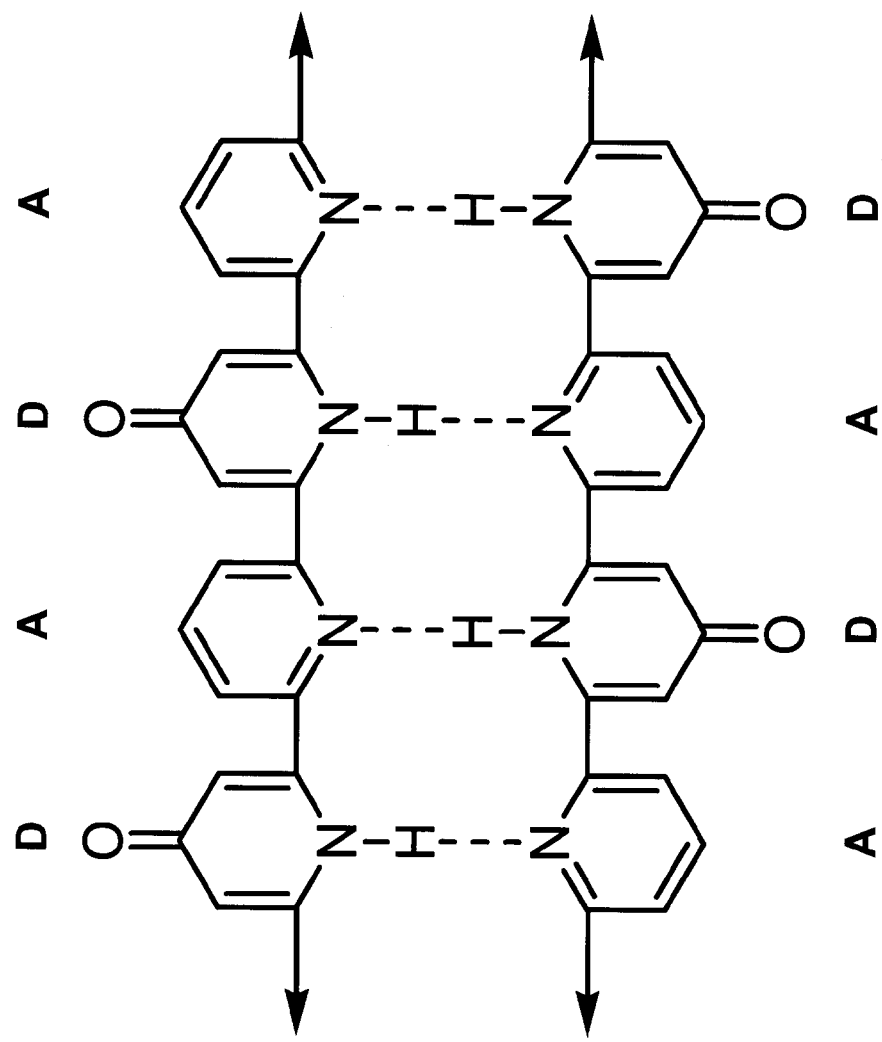
Figure 7:
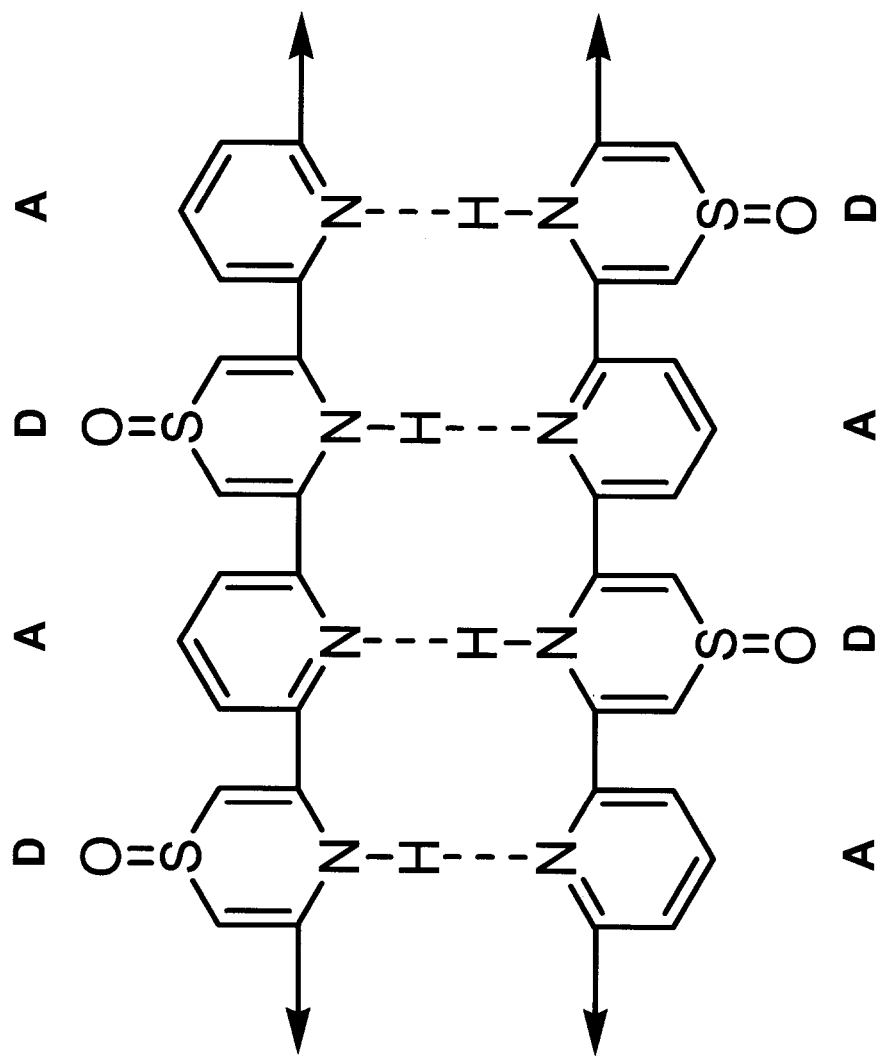
Figure 8:
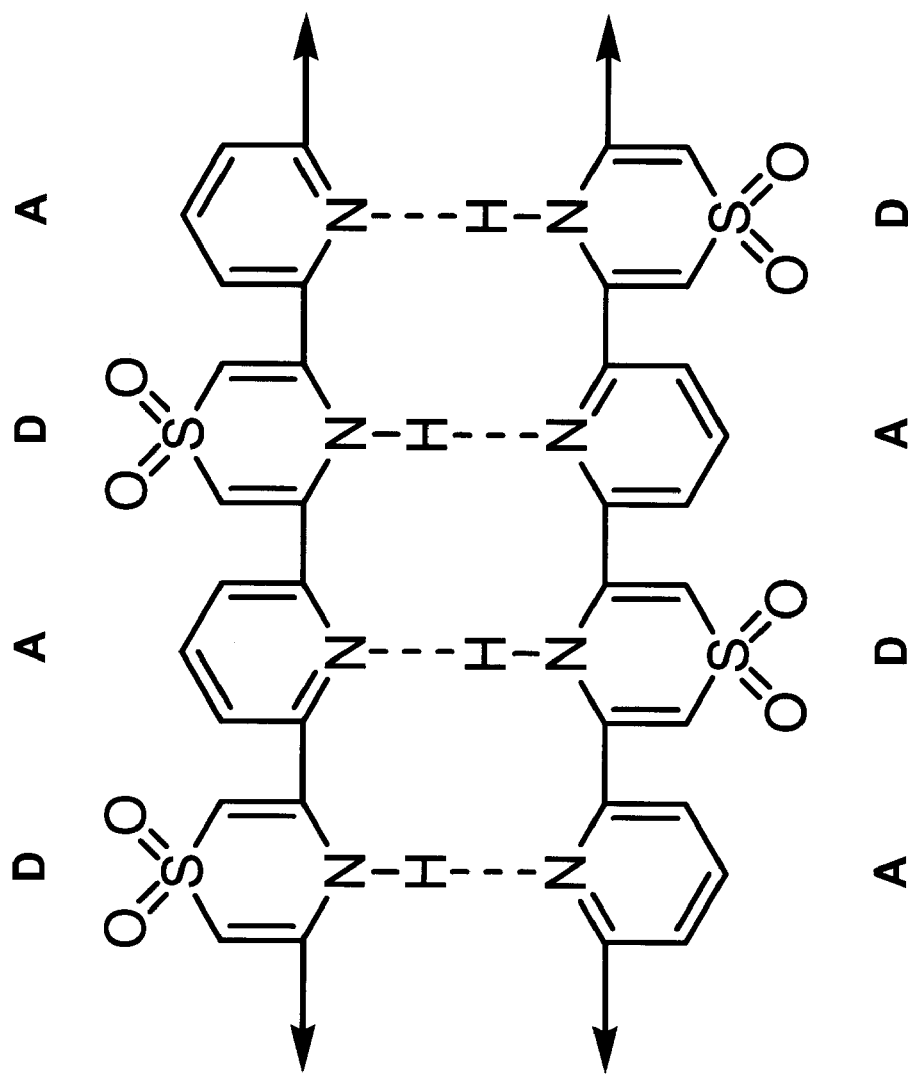

Referring to FIGS. 4 to 8, the present method involves changing the design from a 1,3-disposition of the D/A heteroatoms shown in FIGS. 2 and 3 to a 1,4-disposition of the D/A heteroatoms such as is shown in FIGS. 4 to 8. This provides the opportunity to use individual heterocycles for each of the hydrogen bonding centres. This requires a planar five- or six-membered ring system for both D and A in order to keep the D/A pairs in registration over the length of the oligomers. Furthermore, adjacent rings are connected to one another in a meta-fashion. Studies were conducted using pyrrole/imidazole conjugates but they are air/light sensitive which required too much peripheral modification to be practical. If 6-membered rings are used, pyridine is a preferred choice for the acceptor due to its extensively developed chemistry shown in FIG. 5. With respect to the choice of molecule to use as the donor, 4-Pyridone is not preferred due to its potential equilibrium as the hydroxypyridine tautomer, in fact its primary form in solution, shown in FIG. 6.

Isosteric replacement with other withdrawing groups gives a sulfoxide (not preferred due to chirality and hence the possibility of multiple diastereomers). A preferred donor is a sulfone which yields 1,4-thiazine-1,1'-dioxide, shown in FIG. 8 and the acceptor pyridine, so that the donor/acceptor hydrogen bonding heterocyclic units in of each of the two oligomeric chains are comprised of 1,4-thiazine-1,1-dioxide-3,5-diyl and pyridine-2,6-diyl subunits.

Figure 9:
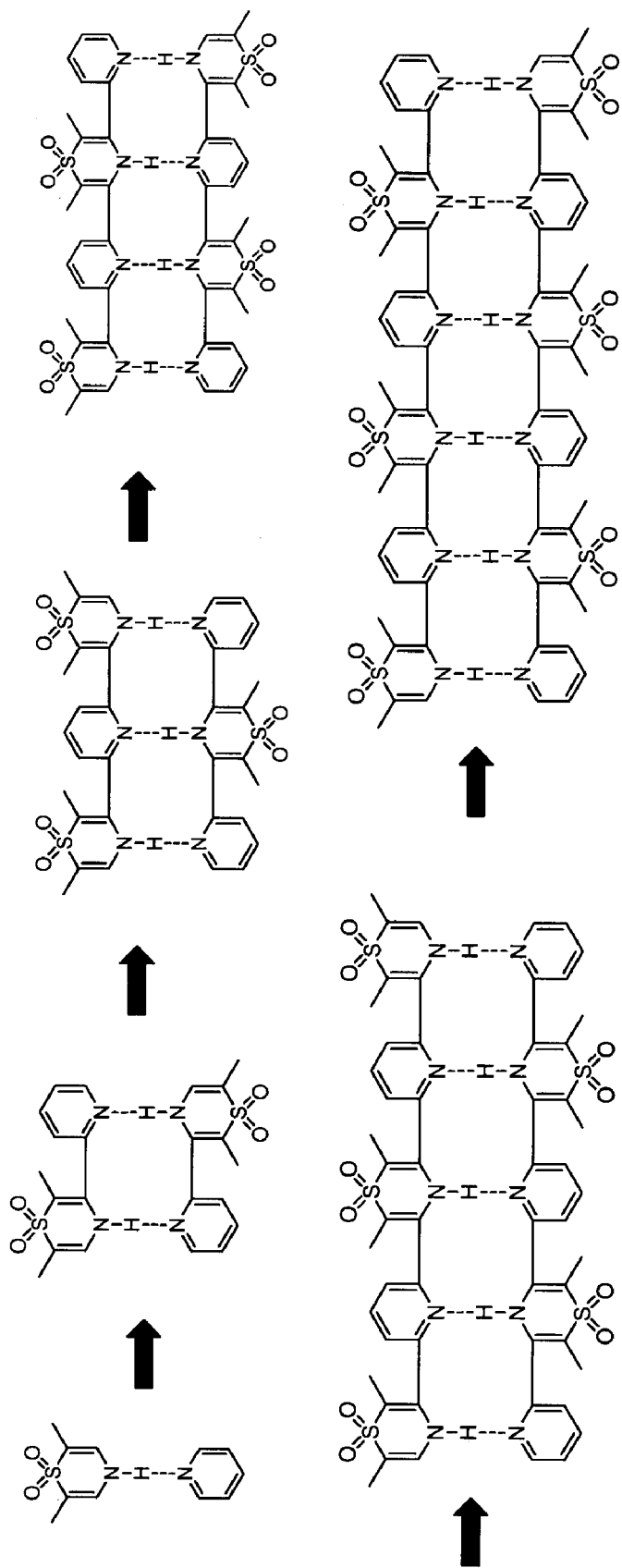
FIG. 9 shows the evolution of a hydrogen-bonded double helix.

FIG. 9 shows the evolution of a hydrogen-bonded double helix. In FIG. 9, the bond angles of the stick figures between the heterocycles are drawn in an incorrect geometry in order to emphasize the interactions between D's and A's. One may imagine a pair of oligomers being built-up of pairs of D/A interactions and wrapping around each other in order to hydrogen-bond to one another which forms a double helix in three dimensions. Following the progression in FIG. 9 it can be seen that the oligomers form a double helical geometry with respect to each other as they are increased in length. It is to be noted that methyl groups have been added to the 2,6-positions of the thiazine dioxide rings. This feature is included so as to bias the adjacent rings out of coplanarity, which reduces the energy required to form what will be a double helical arrangement of the oligomers which may be observed as one transits from one to six membered oligomeric strands. The calculated double helix arrived at has interplanar angles between adjacent heterocycles of between 30-50° and helical pitch of approx. 8.4 Å involving 6 D/A pairs.

The donor/acceptor hydrogen bonding heterocyclic units in of each of the oligomeric chains may be derivatized for purposes of introducing steric bias, chiral bias, moieties or functional groups for chemical linkages to other molecular or supramolecular systems, or they may be derivatized for any of these combinations.

Preferably the number of donor/acceptor hydrogen bonding heterocyclic units in the backbones of the oligomeric chains are between about 3 and 10 but it will be understood that the number will be selected according to the desired strength and kinetic facility of the interaction between the oligomeric chains and so the number may lie outside this range.

Further the pre-selected number and sequence of the donor/acceptor hydrogen bonding heterocyclic units are selected to give properties tunable with regard to disruption from solvent, temperature and stress.

In addition, small amounts of chiral moieties may be incorporated into the backbone of each oligomer chain for inducing a particular handedness to a resulting helical structure formed by the two oligomer chains allowing for the creation of chiral materials.

Figure 10:
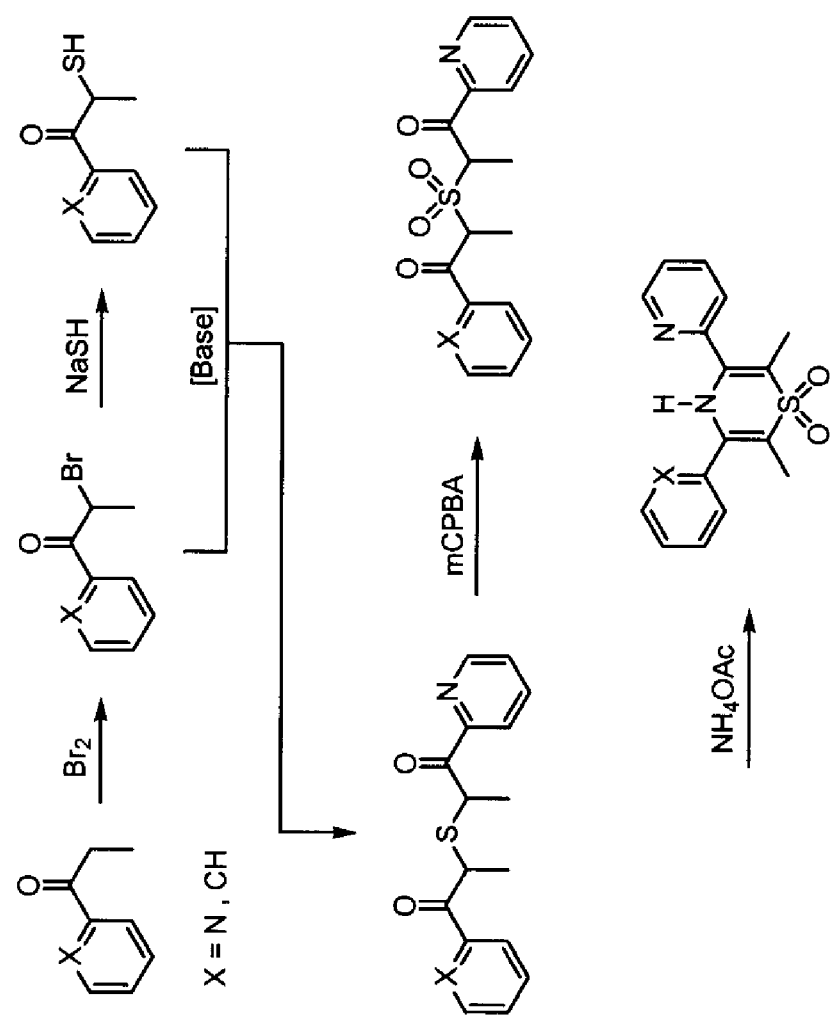
FIG. 10 shows routes for the synthesis of an alternating DA dimer and an ADA trimer.

Referring to FIG. 10, there is shown routes for the synthesis of an alternating DA dimer and an ADA trimer which required the least synthetic difficulty. The synthesis employs very inexpensive starting materials and high yield reactions. As can be seen, these synthetic schemes require optimizing only a few reactions, as they are used in an iterative/convergent manner to generate different length oligomers. We begin with propionyl benzene/pyridine and subject them to α-bromination to generate the α-bromo ketone in very facile reaction. These halides can then be converted into the mercaptans with NaSH (or alternatively AcSH and further hydrolysis). The mercaptan is then combined with the starting halide and base to form a thioether. The thioether is oxidized with mCPBA at low temperature by the classic method and then a double condensation/ring closure with ammonium acetate yields either desired product.

Figure 11:
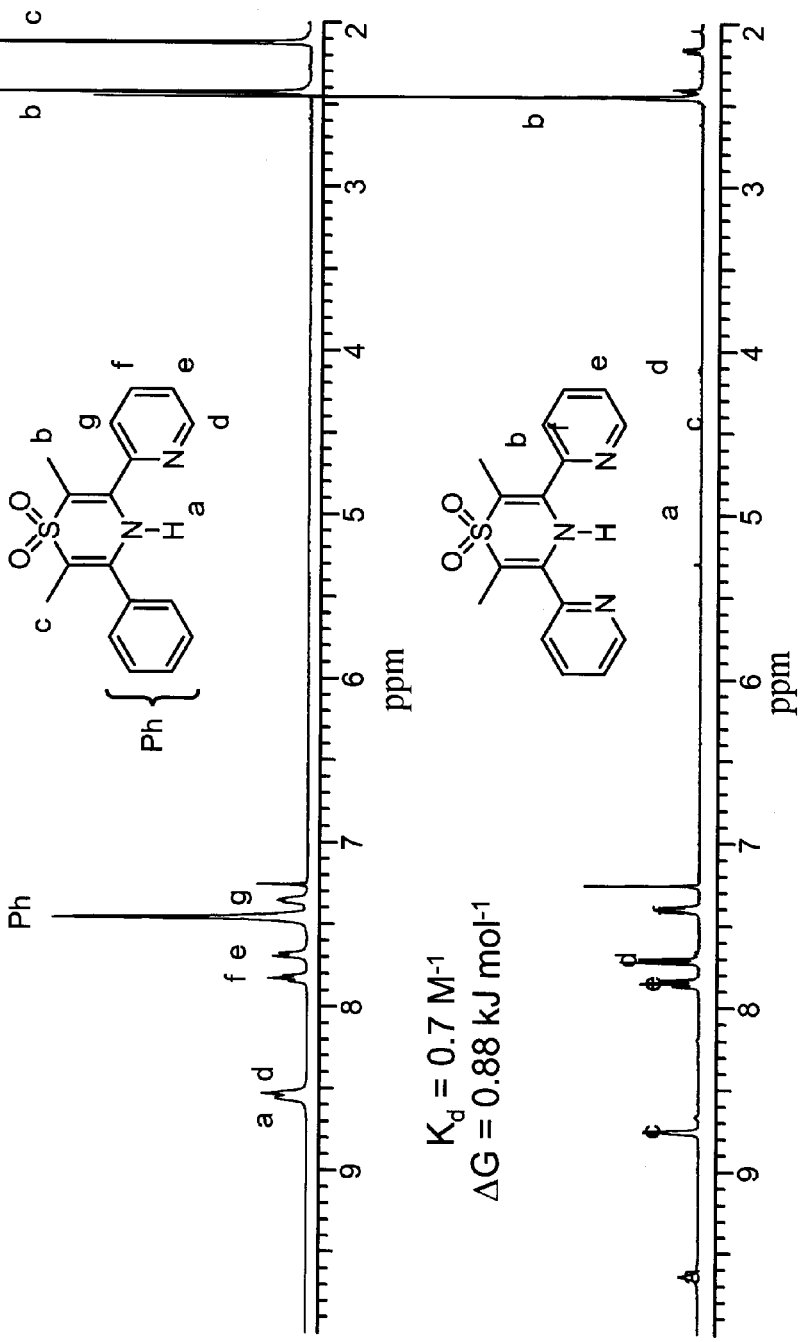
FIG. 11 shows the 1H NMR of the AD Dimer and ADA Trimer produced using the synthesis route of FIG. 10.

Referring to FIG. 11, these two products are stable, soluble compounds and as can be seen from their proton NMR spectra, they resonate where expected. The AD dimer has its methyl groups differentiated due to the differing effects of the exogenous phenyl and pyridyl groups next to them. In the ADA trimer they overlap due to symmetry. Likewise the NH proton of the thiazine dioxide ring appears at approximately 8.6 ppm in the AD dimer and is shifted downfield in the ADA trimer due to both internal hydrogen bonding and the inductive effect of an extra pyridyl ring in the system.

Very weak Kd were measured for these two systems by performing dilution experiments and observing the shift of the NH protons, which gave approximately the same value of $0.7 \text{ M}^{-1}$ for both. This is to be expected from a system which is held together by only two primary hydrogen bonds and has 2 negative secondary interactions as a result of the alternating D/A arrangement. X-ray crystallographic data of crystalline materials of both products confirmed the anticipated hydrogen bonded geometry in the solid state.

Figure 12:
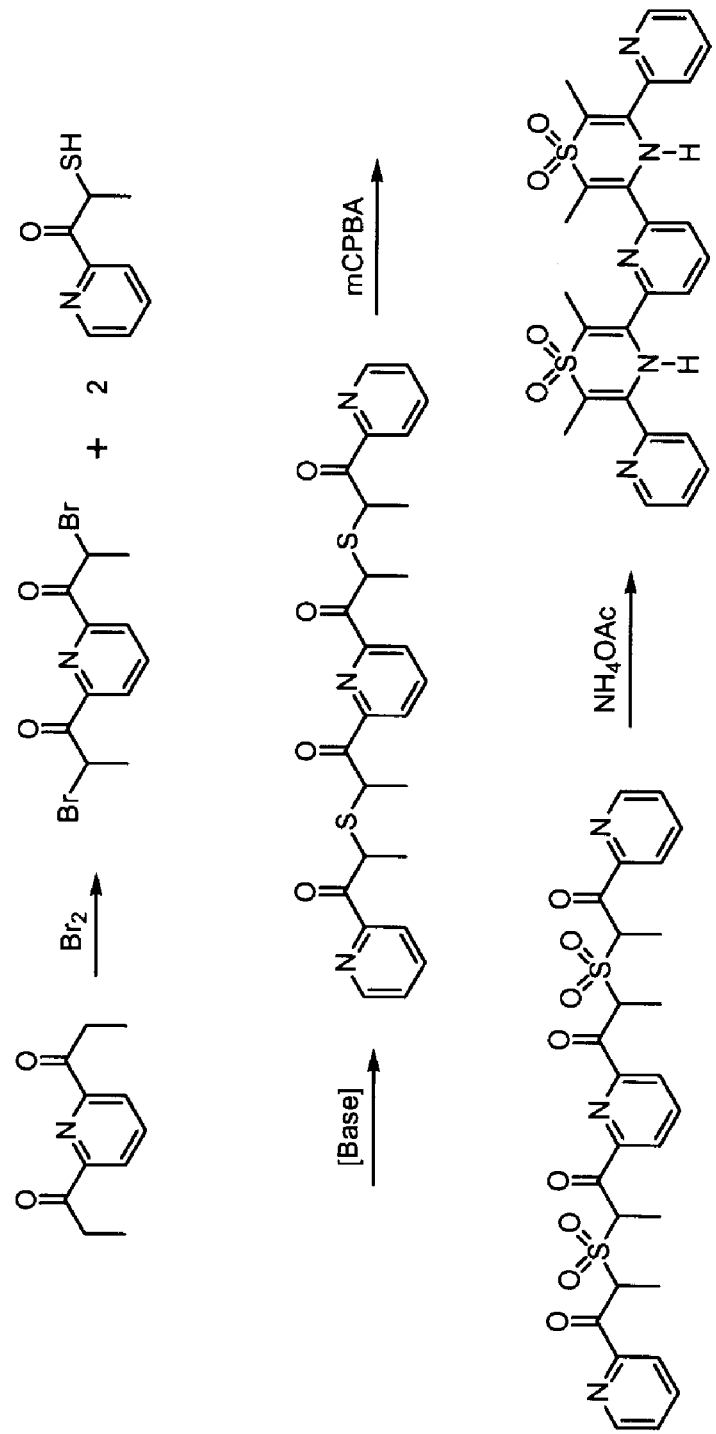
FIG. 12 shows the synthesis of a self-complementary ADADA pentamer.

Given the encouraging results from these test compounds the inventors proceeded with the synthesis of an ADADA pentamer which can form one turn of the double helix, see FIG. 12. The synthesis starts with 2,6-bis-propionyl pyridine which is simply synthesized from 2,6-dicyanopyridine and ethyl grignard reagent in high yield. This compound was doubly α-brominated and then reacted with two equivalents of α-mercaptopropionylpyridine (the synthesis of which was given in FIG. 10) and base to yield a dithioether intermediate. Again this is oxidized to the bis-sulfone and ring closed/ dehydrated with ammonium acetate. Note here that these reactions/conditions are all the same ones used in the previous synthesis and required no further modifications to the earlier procedures. There is now a synthetic "tool-kit" now which we may draw upon to generate these types of compounds.

Figure 13:
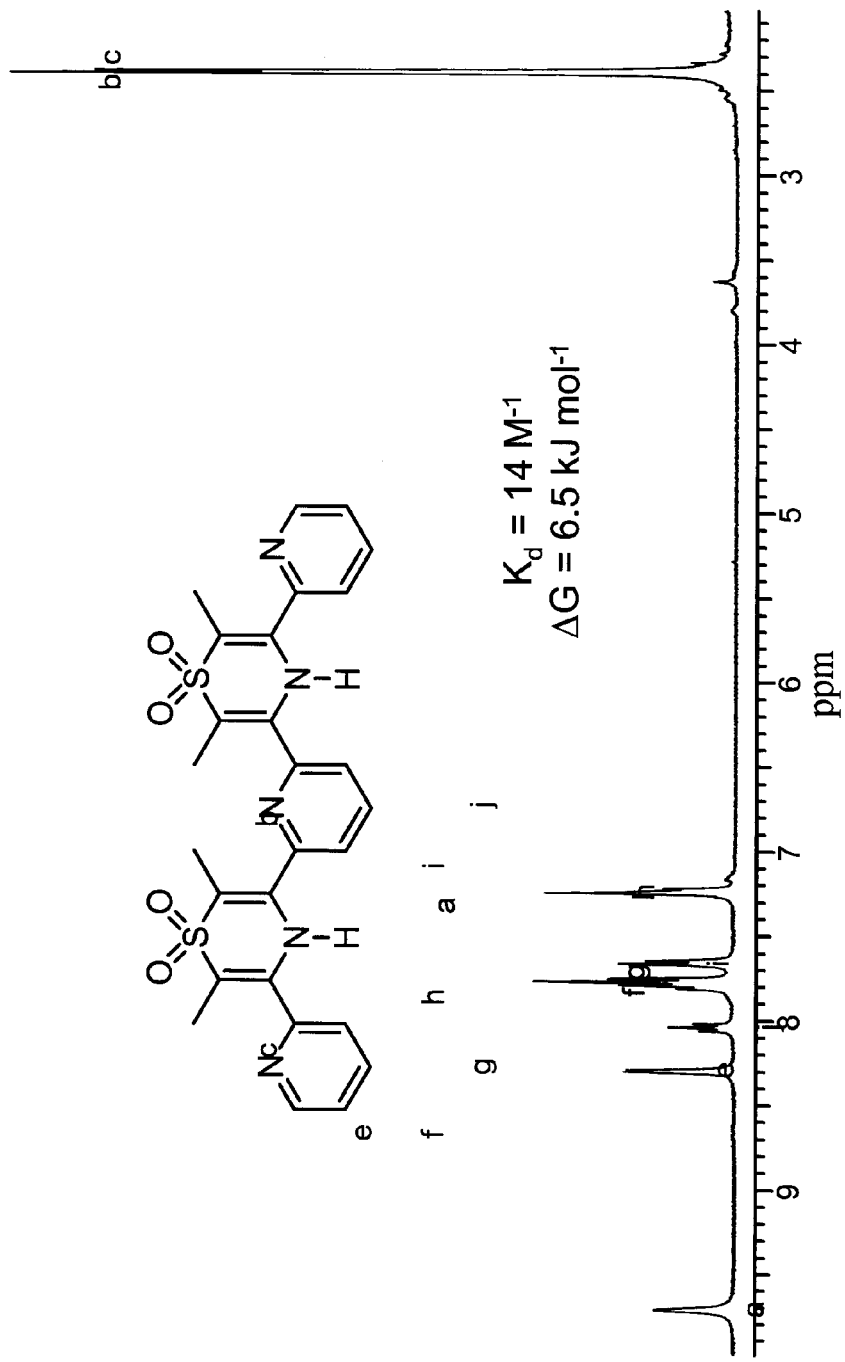
FIG. 13 shows the 1H NMR of the ADADA pentamer of FIG. 12.

FIG. 13 shows the $^1$H NMR of the ADADA pentamer. The proton NMR shows the methyl groups of the thiazine dioxide ring systems are in very similar environments and the NH protons are essentially isochronous. Dilution experiments to determine Kd show shifts of the NH protons downfield as the solutions become more concentrated and the Me groups become more widely spaced. At low temperature the spectrum displays slow exchange on the NMR timescale and gives separate resonances for each proton in the spectrum. Kd was determined by NMR dilution and VT NMR (and an associated van't Hoff plot) which agreed on a value of 4.5 M$^{-1}$. In this case, as in the previous two examples, the pattern of secondary interactions is wholly repulsive and a perusal of a similar system in the literature (Leung et al. *J. Am. Chem. Soc.* 2002, 124, 4287) indicated that this magnitude Kd was to be expected in this situation if the secondary Interactions were of a significant size in comparison to the primary hydrogen bonds. Low temperature ROESY and COSY experiments in conjunction with X-ray crystallographic data confirmed the double-helical geometry of the complex in the solution and solid states.

Figure 14:
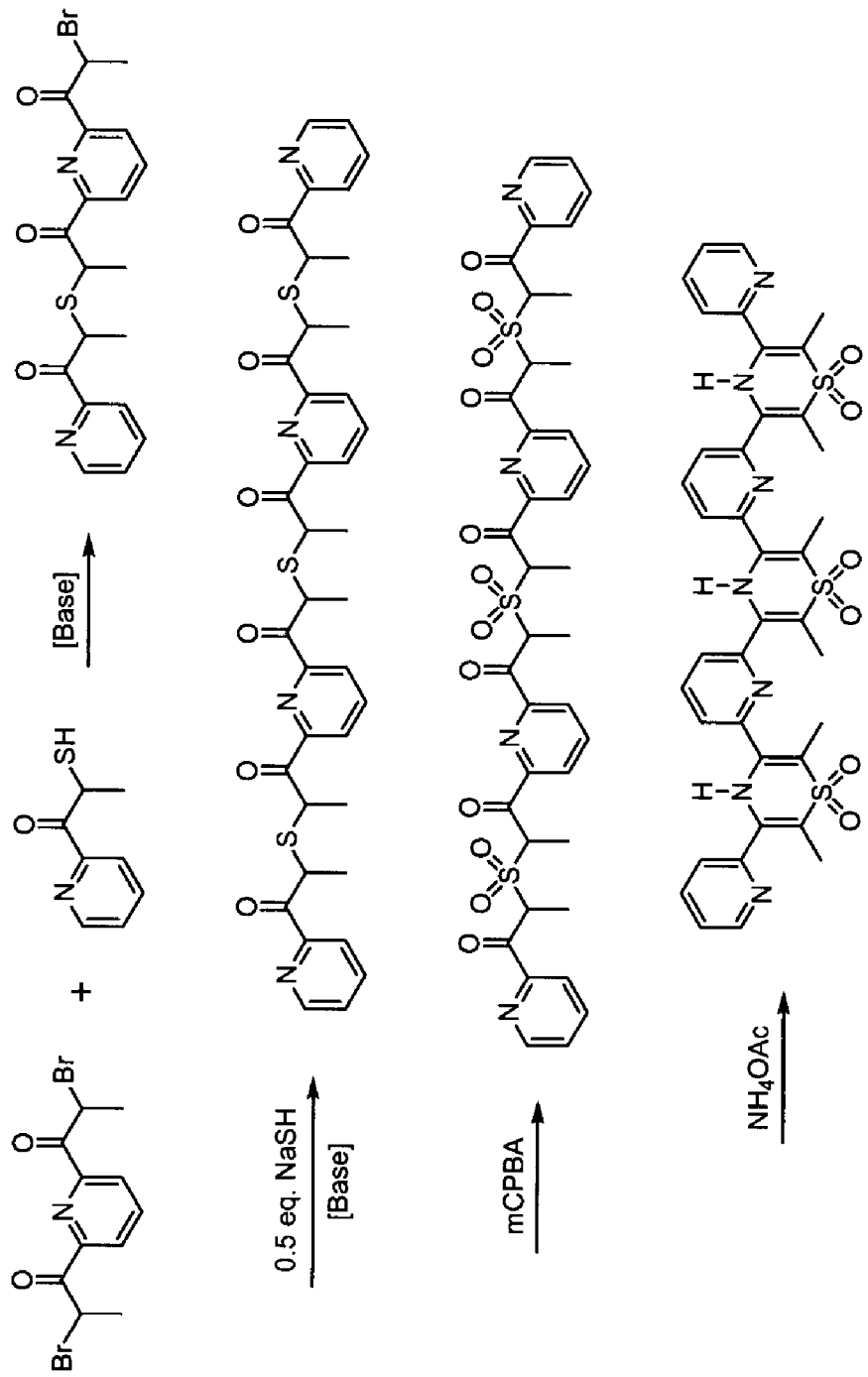
FIG. 14 shows the synthesis of a self-complementary ADADADA heptamer.

FIG. 14 shows the synthesis of an ADADADA heptamer, which we anticipated would form 1.5 turns of the double helix. Here we begin with Bis-(α-bromopropionyl)pyridine (the synthesis was described in a previous slide) and now react it statistically with only 1 equivalent of α-mercaptopropionyl pyridine to give the monothioether intermediate. This may be used to generate a terthioether by either generating the mercaptan and reacting with the preceding bromide, or as pictured here, reacting the monobromide with a half an equivalent of NaSH and base. This intermediate was then carried forward in the same manner as the previous three compounds by oxidizing to the sulphone and then ring closure/dehydration to form the final ADADADA heptamer desired.

The resulting heptamer is not very soluble in CDCl$_3$ and the proton NMR pictured in FIG. 15 is now taken in deuterated DMSO. It should be noted that a Kd of approximately 280 M$^{-1}$ was predicted for this compound based on the dimerization constants of the previous three compounds. The maximum solubility of the heptamer (approx. 1 mg/ml) is about that concentration which would be predominantly monomer in solution. Dilution of a solution of this concentration shows little change in chemical shift of the respective NH protons indicating this is the case. This leads us to believe that it is not the monomer that is insoluble so much as the dimer or higher oligomers. In any event no determination of the Kd was possible in this case.

These test compounds establish a protocol for the synthesis of the oligomers and further oligomers with different sequences may be prepared in a substantially similar manner. Oligomers with different sequences involving positive secondary interactions could be reasonably anticipated to have much higher Ka (of heteroassociation) or Kd values.

In order to attach the oligomers to monomeric or polymeric backbones the oligomers are preferably synthesized with phenolic, benzoic acid, or styrenyl end groups (at terminal 6-pyridine or 5-thiazine-1,1-dioxide positions) which may be connected to the supports using a variety of well-known methods, some of which are illustrated below. Note these examples are meant to be non-limiting and those skilled in the art will appreciate other alternatives are available.

AS Telechelic End Units

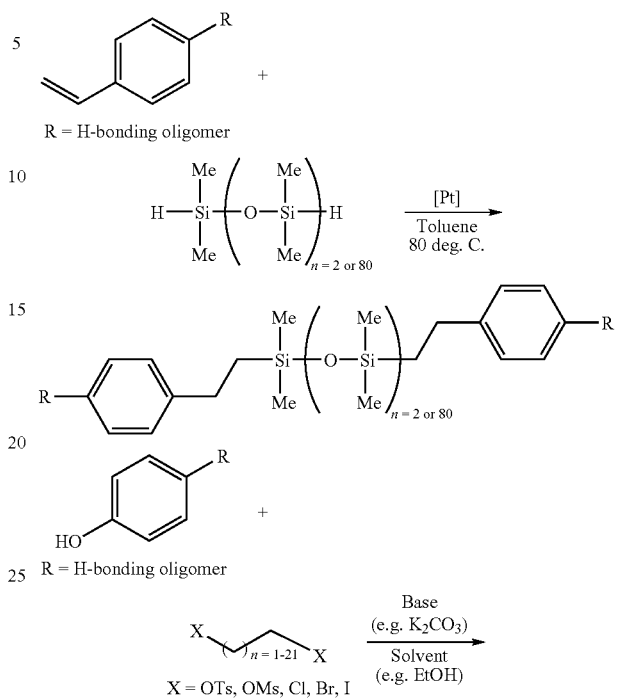

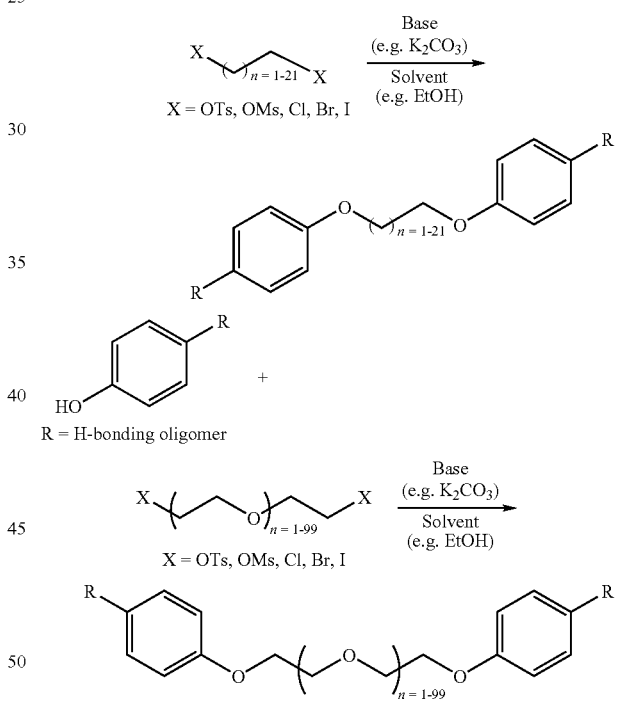

AS Comonomers

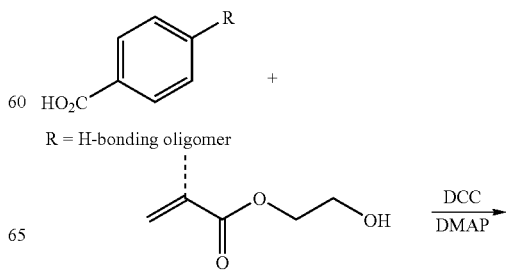

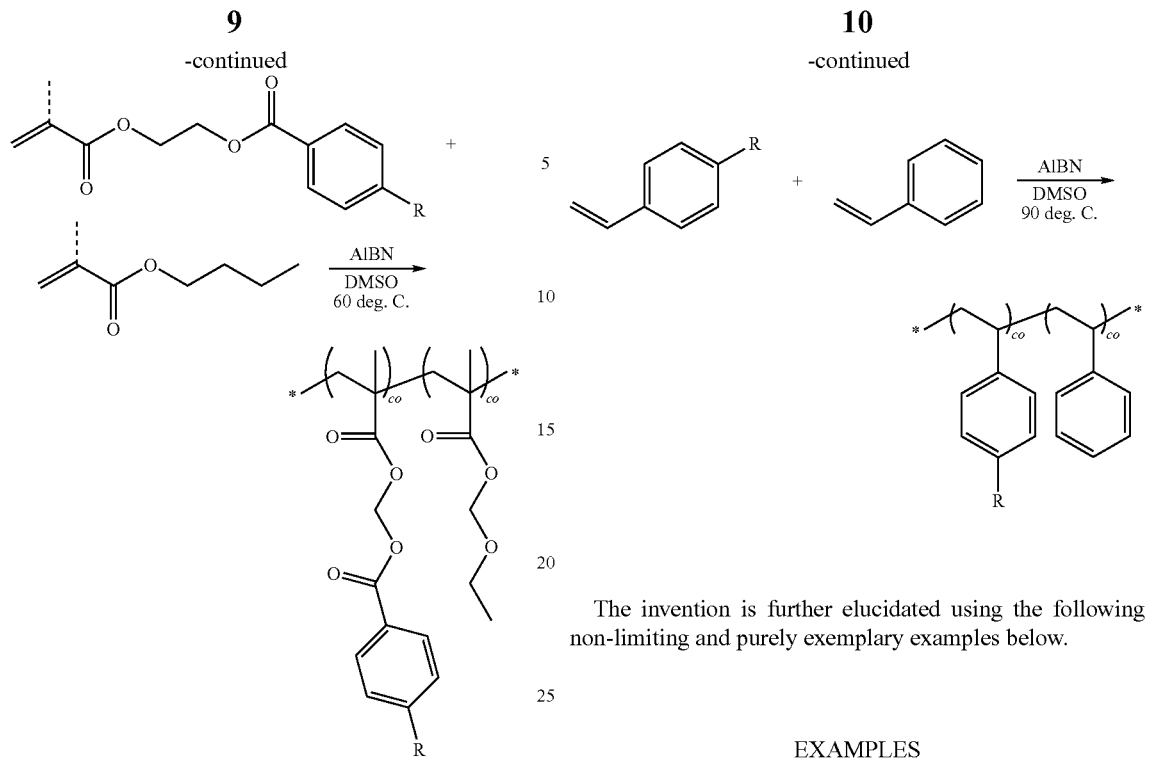
The invention is further elucidated using the following non-limiting and purely exemplary examples below.
EXAMPLES
Synthesis of ADADA Pentamer
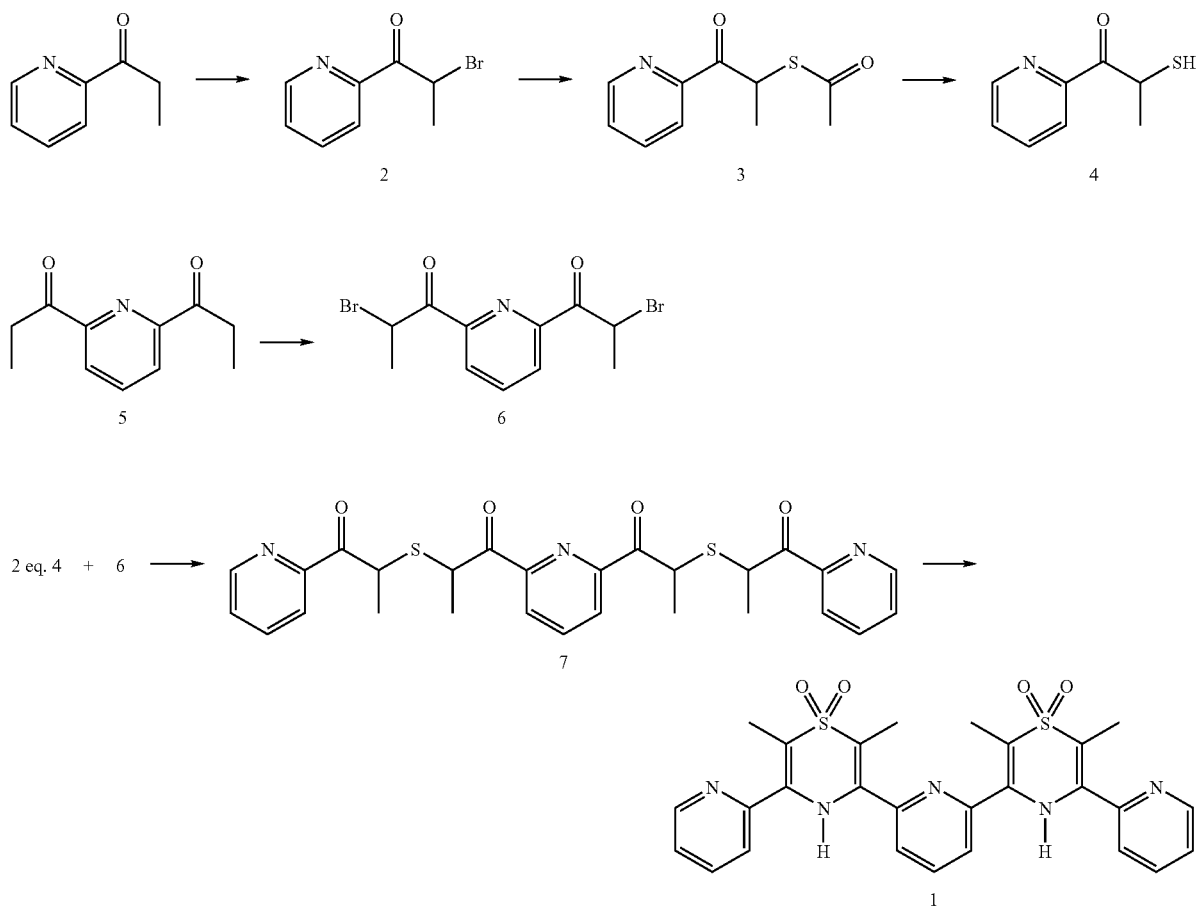

General Methods All reactions were carried out under an atmosphere of dry $N_2$ unless otherwise stated. All solvents were dried and distilled before use according to standard laboratory procedures. Chromatography was performed on Merck 240-400 mesh silica gel-60. All the solvents were dried using an Innovative Technology solvent purification system SPS-400-5. $CDCl_3$ was purchased from Cambridge Isotope Laboratories and dried over 4 Å molecular sieves before use. $^1H$ and $^{13}C$ NMR spectra were collected on Varian INOVA 400 and INOVA 600 spectrometers as specified. Spectra are reported with residual solvent peak as reference from TMS. UV-Vis spectra were obtained from an Ocean Optics SD-2000 Spectrometer with a Mini-D2T light source. Mass spectra were obtained on a Finnigan MAT 8200 mass spectrometer. Melting points were acquired on a Gallenkamp melting point apparatus (Design number: 889339) and are uncorrected. 2-Propionylpyridine and 5 were prepared by alkylation and aqueous workup of their respective cyanopyridines with EtMgBr (see: Knebel, N. G.; von Angerer, E. *J. Med. Chem.* 1991, 34, 2145-2152).

Synthesis of 2: A solution of 2-propionylpyridine (8.08 g, 59 mmol) in diethyl ether (10 mL) was treated with solid $AlCl_3$ (0.08 g, 0.6 mmol) at 0° C. and stirred for 5 min. $Br_2$ (3.0 mL, 60 mmol) in diethyl ether (10 mL) was then added dropwise over 15 min. The mixture was allowed to stir vigorously for 6 h before it was neutralized with a sat. aq. $NaHCO_3$ solution. After extraction with $CH_2Cl_2$, the organic layer was washed with sat. aq. NaCl, $H_2O$, dried with $MgSO_4$, and evaporated under reduced pressure. The residue was purified by column chromatography ($CH_2Cl_2$/EtOAc 1:1; $R_f$=0.69). The product was obtained as a light yellow oil in a yield of 90%: $^1H$ NMR (400 MHz, $CDCl_3$) δ 8.71 (ddd, 1H, $J_1$=4.7 Hz, $J_2$=1.6 Hz, $J_3$=0.8 Hz, H-6 (pyridine)), 8.12 (ddd, 1H, $J_1$=7.8 Hz, $J_2$=1.2 Hz, $J_3$=1.0 Hz, H-3 (pyridine)), 7.88 (ddd, 1H, $J_1$=7.8 Hz, $J_2$=7.6 Hz, $J_3$=1.8 Hz, H-4 (pyridine)), 7.51 (ddd, 1H, $J_1$=7.6 Hz, $J_2$=4.7 Hz, $J_3$=1.1 Hz, H-5 (pyridine)), 6.05 (q, 1H, J=6.8 Hz, $CHBrCH_3$), 1.90 (d, 3H, J=6.8 Hz, $CHBrCH_3$). $^{13}C$ NMR ($CDCl_3$) δ 194.91, 151.35, 149.31, 137.42, 127.88, 123.60, 41.31, 19.97. EI-HRMS Calcd for $C_8H_8NOBr$ ($M^+$) m/z: 212.9789, Found: 212.9787.

Synthesis of 3: A solution of potassium thioacetate (1.48 g, 13 mmol) in THF (50 mL) was stirred at room temperature for 10 min. A solution of 2 (2.14 g, 10 mmol) in THF (10 mL) was added dropwise over 15 min. and the mixture was allowed to stir for 14 h. After adding 60 mL $H_2O$, the brown slurry became clear and it was extracted with EtOAc and $CH_2Cl_2$. The extracts were combined, dried over $MgSO_4$, and evaporated under vacuum. The residue was purified by column chromatography (EtOAc/hexanes 1:1; $R_f$=0.60). The racemic product was obtained as a yellow oil in a quantitative yield. $^1H$ NMR (400 MHz, $CDCl_3$) δ 8.70 (ddd, 1H, $J_1$=4.6 Hz, $J_2$=1.7 Hz, $J_3$=0.9 Hz, H-6 (pyridine)), 8.04 (ddd, 1H, $J_1$=7.9 Hz, $J_2$=1.2 Hz, $J_3$=1.0 Hz, H-3 (pyridine)), 7.84 (ddd, 1H, $J_1$=7.9 Hz, $J_2$=7.5 Hz, $J_3$=1.7 Hz, H-4 (pyridine)), 7.49 (ddd, 1H, J=7.5 Hz, $J_2$=4.8 Hz, $J_3$=1.2 Hz, H-5 (pyridine)), 5.80 (q, 1H, J=7.2 Hz, $CHCH_3$), 2.32 (s, 3H, $COCH_3$), 1.57 (d, 3H, J=7.2 Hz, $CHCH_3$). $^{13}C$ NMR ($CDCl_3$) δ 198.32, 194.02, 151.44, 148.68, 136.64, 127.03, 122.38, 42.48, 29.69, 16.77. EI-HRMS Calcd for $C_{10}H_{11}NSO_2$($M^+$) m/z: 209.0510, Found: 209.0504.

Synthesis of 4: A solution of 3 (1 g, 4.8 mmol) in diethyl ether (10 mL) was stirred while 2 M aq. NaOH solution (5 mL, 10 mmol) was added dropwise over 10 minutes. The mixture was stirred for a further 2.5 h and then the phases separated. The aqueous layer was neutralized at 0° C. and extracted with $CH_2Cl_2$. The combined organic phases were dried with $MgSO_4$ and evaporated under vacuum. The residue was purified by column chromatography (pet. Ether/EtOAc 4:1; $R_f$=0.39). The racemic product was obtained as colorless oil in a yield of 70%. $^1H$ NMR (400 MHz, $CDCl_3$) δ 8.65 (ddd, 1H, $J_1$=4.7 Hz, $J_2$=1.8 Hz, $J_3$=1.0 Hz, H-6 (pyridine)), 8.10 (ddd, 1H, $J_1$=7.8 Hz, $J_2$=1.4 Hz, $J_3$=0.8 Hz, H-3 (pyridine)) 7.85 (ddd, 1H, $J_1$=7.8 Hz, $J_2$=7.6 Hz, $J_3$=1.8 Hz, H-4 (pyridine)), 7.47 (ddd, 1H, $J_1$=7.6 Hz, $J_2$=4.7 Hz, $J_3$=1.2 Hz, H-5 (pyridine)), 5.03 (dq, 1H, $J_1$=9.4 Hz, $J_2$=7.0 Hz, $SHCHCH_3$), 2.10 (d, 1H, J=9.4 Hz, SHCH), 1.58 (d, 3H, J=6.8 Hz, $CHCH_3$). $^{13}C$ NMR ($CDCl_3$) δ 197.88, 151.30, 148.49, 136.75, 126.90, 122.79, 34.39, 18.90. EI-HRMS Calcd for $C_8H_8NSO$($M^+$) m/z: 166.0327, found: 166.0327.

Synthesis of 6: A solution of 5 (6.16 g, 32 mmol) in diethyl ether (50 mL) was treated with solid $AlCl_3$ (0.08 g, 0.6 mmol), stirred for 5 min. and $Br_2$ (3.5 mL, 67 mmol) in diethyl ether (10 mL) was added dropwise at 0° C. over 15 min. The mixture was allowed to stir vigorously for 10 h before it was neutralized with a sat. aq. $NaHCO_3$. After extraction with $CH_2Cl_2$, the organic phases were dried with $MgSO_4$. The solvent was evaporated under vacuum and the residue was purified by column chromatography (pet. Ether/EtOAc 9:1; $R_f$=0.19). The product was obtained as a white crystalline solid and a mixture of diastereomers in a yield of 89%: (diastereomer A) $^1H$ NMR (400 MHz, $CDCl_3$) δ 8.28 (d, 2H, J=7.6 Hz, H-3, 5 (pyridine)), 8.07 (t, 1H, J=7.6 Hz, H-4 (pyridine)), 5.95 (q, 2H, J=6.8 Hz, $CHCH_3$), 1.93 (d, 6H, J=6.8 Hz, $CHCH_3$). $^{13}C$ NMR ($CDCl_3$) δ 193.54, 150.18, 139.02, 127.08, 41.22, 19.85; (diastereomer B) $^1H$ NMR (400 MHz, $CDCl_3$) δ 8.27 (d, 2H, J=8.0 Hz, H-3, 5 (pyridine)), 8.07 (t, 1H, J=8.2 Hz, H-4 (pyridine)), 5.94 (q, 2H, J=6.8 Hz, $CHCH_3$), 1.91 (d, 6H, J=6.8 Hz, $CHCH_3$). $^{13}C$ NMR ($CDCl_3$) δ 193.74, 150.47, 139.02, 127.13, 40.74, 19.78. EI-HRMS Calcd for $C_{11}H_{11}NO_2Br_2$ ($M^+$) m/z: 346.9156, found: 346.9158. M.P. 79.5-81.1° C.

Synthesis of 7: A solution of 4 (1.0 g, 6 mmol) in dry acetonitrile (40 mL) was stirred in a nitrogen-flushed flask for 10 min. 6 (1.0 g, 2.8 mmol) and $K_2CO_3$ (1.4 g, 10 mmol) were added and the flask was then evacuated and backfilled with nitrogen. The mixture was stirred at room temperature for 3 days and monitored by TLC. Upon completion, the precipitate (KBr, $K_2CO_3$) was filtered and rinsed with acetonitrile and $CH_2Cl_2$. The filtrate was dried with $MgSO_4$ and evaporated under vacuum. The filtrate residue was purified by column chromatography (pet. Ether/EtOAc 4:1; $R_f$=0.13). The diastereomeric products were isolated as a yellow oil in a yield of 96%: $^1H$ NMR (400 MHz, $CDCl_3$) δ 8.52-8.61 (m, 2H), 8.15-8.29 (m, 2H), 7.89-8.06 (m, 3H), 7.76-7.85 (m, 2H), 7.41-7.46 (m, 2H), 5.18-5.44 (m, 4H), 1.34-1.57 (m, 12H). $^{13}C$ NMR ($CDCl_3$) δ 198.03, 197.61, 196.65, 152.21, 151.76, 151.64, 151.28, 148.71, 148.56, 138.35, 138.22, 137.01, 136.96, 127.30, 127.12, 127.13, 126.39, 126.31, 126.26, 126.17, 123.11, 123.04, 122.93, 122.83, 40.77, 40.71, 40.66, 40.62, 40.57, 40.46, 39.95, 17.71, 17.68, 16.94, 16.81, 16.71. (Some peaks may not be described as this is a diastereomeric mixture.) EI-HRMS Calcd for $C_{27}H_{27}N_3S_2O_4$ ($M^+$) m/z: 521.1443, Found: 521.1440.

Synthesis of 1: A solution of 7 (1.7 g, 3.3 mmol) in $CH_2Cl_2$ (50 mL) was stirred for 5 min at −78° C. 3.6 g mCPBA (77%, 16.3 mmol) was dissolved in 60 mL $CH_2Cl_2$ and added to the solution dropwise over 15 minutes. The reaction mixture was maintained at −78° C. for 5 h before it was slowly warmed up to −20° C. The reaction was monitored by $^1H$ NMR. Upon completion (loss of the signals at δ=5.18-5.44 ppm), the reaction solution was quenched with sat. aq. $NaHCO_3$. The mixture was extracted with $CH_2Cl_2$, and washed with sat. aq. NaCl and $H_2O$. The organic phase was dried with $MgSO_4$, filtered and evaporated. The crude product was a white solid in a yield of 93% that was carried through to the next reaction without further purification.

The preceding crude product (0.9 g, 1.6 mmol) was dissolved in glacial acetic acid (35 mL) and solid $NH_4OAC$ (1.2 g, 16 mmol) added. The solution was refluxed for 18 hours. The reaction mixture was then cooled to room temperature and poured onto ice. The precipitate formed was collected by filtration and purified by column chromatography (MeOH/$CH_2Cl_2$ 1:20; $R_f$=0.41). The product was obtained as a white crystalline solid in a yield of 71%: $^1H$ NMR (400 MHz, $CDCl_3$) δ 9.71 (s, 2H), 8.32 (ddd, 2H, $J_1$=4.7 Hz $J_1$=1.6 Hz $J_1$=0.8 Hz), 8.05 (t, 1H, J=7.8 Hz), 7.80 (m, 4H), 7.68 (d, 2H, J=8.0 Hz), 7.25 (m, 2H), 2.42 (s, 6H), 2.41 (s, 6H). $^{13}C$ NMR ($CDCl_3$) δ 150.55, 149.52, 149.11, 137.94, 137.29, 136.64, 136.45, 125.08, 124.30, 124.18, 107.30, 106.62, 9.54, 9.44. HRCl-MS Calc for $C_{27}H_{25}S_2O_4N_5$ $(M+H)^+$ m/z: 548.1426, found: 548.1440. M.P. 115° C. (dec.).

In summary, it has been shown that it is possible to prepare supramolecular oligomers containing sequence-selective hydrogen bonding subunits in their backbone which form double helices.

In an embodiment of the invention there is provided a method by which oligomers consisting of pyridine (hydrogen bond acceptor) and thiazine-1,1-dioxide (hydrogen bond donor) are connected to each other in any arrangement and number of donors and acceptors through the 2,6-(pyridine) and the 3,5-(thiazine dioxide) positions. These oligomers may be attached to existing polymers/oligomers (e.g. polysiloxane, polyethylene glycol, polystyrene, polyethylene, polyphenols, polyacrylates, polyesters, etc.) through attachment/incorporation of the polymer/oligomer backbones and/or telechelic sites at any one or all of the 3, 4, and 5 positions of the pyridine subunits and/or the 2 and/or 6 positions of the thiazine dioxide subunits using covalent linkages. Incorporation of small amounts of chiral material as covalent modifications of the basic donor/acceptor backbone at the aforementioned positions also induces a particular handedness to the resulting helical structures formed allowing for the creation of chiral materials with little chiral material required. Additionally, these supramolecular polymer systems may be used to induce microphase separation in blends with normal polymers to create micropatterned materials.

Therefore, the present invention employs an entirely new system of molecules, unknown in the chemical literature, a non-limiting but preferred example of which includes hydrogen bond Donor (thiazine-1,1-dioxide) and Acceptor (pyridine) subunits which may be "stitched" together synthetically to form any sequence desired. Molecular strands with complementary sequences form a double helix geometry upon reversible association of the two strands in a manner reminiscent of DNA. These molecular strands are then appended to polymer backbones and as end units in short monomeric chains. The resulting materials will behave as regular polymers under standard conditions. However, the reversible nature of the linkages provided by the interaction of appended strands provide a method by which the properties may be radically altered using external stimuli such as changes in temperature, stress and solvent conditions. These changes in physical attributes are generally abrupt and tunable in contrast to traditional polymer materials.

It will be understood that the supramolecular oligomers can be attached to other molecular or supramolecular systems besides polymers and they will embue the same types of properties to those systems as described for polymers by altering their comparable properties, for example but not limited to nanoparticles.

The inventors have synthesized self-complementary molecules of this type incorporating AD, ADA, DAD, ADADA, and ADADADA sequences, all of which form self-associated double helices in the solid state.

With respect to U.S. Pat. No. 6,320,018, the present method disclosed herein utilizes different end groups whose kinetics and thermodynamics of association may be selected for by alteration during synthesis of both the length and sequence of the hydrogen bond donors and acceptors in the groups. Very advantageously, the ability to tune these aspects of the interaction leads to much greater control of the physical properties of the final supramolecular polymer material and hence, control of the final virtual molecular weight and the subsequent materials properties. It also allows for the use of two different monomers, the end groups of which are complementary to the other monomer, such that their admixture produces a virtual high molecular weight material but with alternating comonomers making up the backbone of the structure. These comonomers may have the same or different links between end groups of the individual molecules which may provide for even greater variation of the materials properties.

With respect to U.S. Pat. No. 6,803,447, the present method disclosed herein is advantageous over the approach in U.S. Pat. No. 6,803,447 for the same reasons above as discussed with respect to U.S. Pat. No. 6,320,018. The present method utilizes different end groups whose kinetics and thermodynamics of association may be selected for by alteration during synthesis of both the length and sequence of the hydrogen bond donors and acceptors in the groups. The ability to tune these aspects of the interaction leads to presumably much greater control of the physical properties, which result from crosslinking, of the final supramolecular polymer material (See M. J. Serpe and S. L. Craig, Langmuir, 2007, 1626-1634; and references therein). This would include the ability to tune the concentration at which the viscosity sharply increases and temperature at which the distinct changes in melt viscosity would be observed at a constant ratio of comonomer (self-associating) incorporation.

With respect to U.S. Pat. No. 7,025,813, the present invention provides for a more coherently tunable system due to the greater range and continuity of association thermodynamics and kinetics which will presumably improve the operating range of concentrations of the formulation or more accurately tune the temperature and rapidity at which a phase change from solid to liquid occurs.

The invention disclosed herein has a wide range of specialty polymer applications. These include, but are not limited to, smart adhesives, thermally activated inks and printing processes, coatings and self-healing materials.

For example, polymers having the hydrogen bonding oligomers attached thereto facilitates significant improvements in a wide variety of existing polymer applications such as hot melts, highly specific adhesives, thermal inks, and thermoplastics. The polymers having the present oligomers attached thereto respond differently in terms of their properties to for example changes in temperature or response to solvent exposure compared to the unmodified polymers. For example a polymer modified with the present hydrogen bonding oligomers when heated will exhibit a relatively sharp change in viscosity due to rupture of the hydrogen bonding.

Another unexpected surprising feature of the present invention is that the integration of this approach into current polymer technology will enable the use of lower operating temperatures during polymer processing (i.e. lower energy costs) and produce more easily recyclable materials without sacrificing the quality of the polymer products. Hence, the present invention has the potential to considerably reduce the environmental impact and cost of plastics production and processing.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A supramolecular oligomer comprising at least two oligomeric chains each having a backbone with pre-selected numbers and sequences of covalently attached donor/acceptor hydrogen bonding heterocyclic, wherein in each oligomeric chain, heteratoms in neighboring hydrogen bonding heterocyclic units participating in hydrogen bonding are in a 1,4 disposition with respect to each other, wherein the at least two oligomeric chains hydrogen bond together in a sequence specific manner to form a double helix, whose overall strength of intermolecular interaction is tunable by the pre-selected number and sequence of the hydrogen bonding heterocyclic units in each oligomeric chain.

2. The supramolecular oligomer according to claim 1 wherein said donor/acceptor hydrogen bonding heterocyclic units in each of said at least two oligomeric chains are derivatized for purposes of introducing any one of steric bias, chiral bias, moieties for chemical linkages to other molecular or supramolecular systems, and any combination thereof.

3. The supramolecular oligomer according to claim 1 wherein said donor/acceptor hydrogen bonding heterocyclic units in each of said at least two oligomeric chains are comprised of 1,4-thiazine-1, 1-dioxide-3,5-diyl and pyridine-2,6-diyl subunits.

4. The supramolecular oligomer according to claim 1 wherein said donor/acceptor hydrogen bonding heterocyclic units in of each of said at least two oligomeric chains are comprised of 1,4-thiazine-1,1-dioxide-3,5-diyl and pyridine-2,6-diyl and substituted derivatives thereof.

5. The supramolecular oligomer according to claim 4 wherein said substituted derivatives are derivatized for purposes of introducing any one of steric bias, chiral bias, moieties for chemical linkages to other molecular or supramolecular systems, and any combination thereof.

6. The supramolecular oligomer according to claim 1 wherein said pre-selected number of donor/acceptor hydrogen bonding heterocyclic units in said backbone are between about 3 and 10.

7. The supramolecular oligomer according to claim 1 wherein a first of said at least two oligomeric chains is chemically attached to a first polymeric or monomeric material and wherein a second of said at least two oligomeric chains is chemically attached to a second polymeric or monomeric material and wherein said at least two oligomeric chains hydrogen bond together said first and second polymeric or monomeric materials are reversibly crosslinked or polymerized.

8. The supramolecular oligomer according to claim 7 wherein said first and second oligomeric chains include end groups at one or both ends of the respective oligomeric chain which end groups are chemically attached to the monomer or polymer materials.

9. The supramolecular oligomer according to claim 8 wherein said end groups are selected from the group consisting of phenolic, benzoic acid, benzylic and styrenyl end groups.

10. The supramolecular oligomer according to claim 7 wherein said first and second oligomeric chains are derivatized in a manner to allow them to be polymerized or copolymerized with one or more co-monomers.

11. The supramolecular oligomer according to claim 1 wherein said pre-selected number and sequence of said donor/acceptor hydrogen bonding heterocyclic units are selected to give properties tunable with regard to disruption from solvent, temperature and stress.

12. The supramolecular oligomer according to claim 1 wherein small amounts of chiral moieties are incorporated into the backbone of each oligomer chain for inducing a particular handedness to a resulting helical structure formed by said at least two oligomer chains allowing for the creation of chiral materials.

13. The supramolecular oligomer according to claim 2 wherein said pre-selected number of donor/acceptor hydrogen bonding heterocyclic units in said backbone are between about 3 and 10.

14. The supramolecular oligomer according to claim 2 wherein a first of said at least two oligomeric chains is chemically attached to a first polymeric or monomeric material and wherein a second of said at least two oligomeric chains is chemically attached to a second polymeric or monomeric material and wherein said at least two oligomeric chains hydrogen bond together said first and second polymeric or monomeric materials are reversibly crosslinked or polymerized.

15. The supramolecular oligomer according to claim 3 wherein said pre-selected number of donor/acceptor hydrogen bonding heterocyclic units in said backbone are between about 3 and 10.

16. The supramolecular oligomer according to claim 3 wherein a first of said at least two oligomeric chains is chemically attached to a first polymeric or monomeric material and wherein a second of said at least two oligomeric chains is chemically attached to a second polymeric or monomeric material and wherein said at least two oligomeric chains hydrogen bond together said first and second polymeric or monomeric materials are reversibly crosslinked or polymerized.

17. The supramolecular oligomer according to claim 3 wherein small amounts of chiral moieties are incorporated into the backbone of each oligomer chain for inducing a particular handedness to a resulting helical structure formed by said at least two oligomer chains allowing for the creation of chiral materials.

18. The supramolecular oligomer according to claim 4 wherein said pre-selected number of donor/acceptor hydrogen bonding heterocyclic units in said backbone are between about 3 and 10.

19. The supramolecular oligomer according to claim 4 wherein a first of said at least two oligomeric chains is chemically attached to a first polymeric or monomeric material and wherein a second of said at least two oligomeric chains is chemically attached to a second polymeric or monomeric material and wherein said at least two oligomeric chains hydrogen bond together said first and second polymeric or monomeric materials are reversibly crosslinked or polymerized.

20. The supramolecular oligomer according to claim 4 wherein small amounts of chiral moieties are incorporated into the backbone of each oligomer chain for inducing a particular handedness to a resulting helical structure formed by said at least two oligomer chains allowing for the creation of chiral materials.

21. The supramolecular oligomer according to claim 1 wherein said donor/acceptor hydrogen bonding heterocyclic units in each of said at least two oligomeric chains are covalently attached in a meta disposition.

* * * * *